US012202056B2

(12) United States Patent
Barezzani et al.

(10) Patent No.: US 12,202,056 B2
(45) Date of Patent: Jan. 21, 2025

(54) DRILL FOR DRILLING RAILWAY SLEEPERS

(71) Applicant: Cembre S.p.A., Brescia (IT)

(72) Inventors: Gualtiero Barezzani, Brescia (IT); Michele Orizio, Brescia (IT)

(73) Assignee: Cembre S.p.A., Brescia (IT)

( * ) Notice: Subject to any disclaimer, the term of this patent is extended or adjusted under 35 U.S.C. 154(b) by 1054 days.

(21) Appl. No.: 17/047,983

(22) PCT Filed: Apr. 17, 2019

(86) PCT No.: PCT/IB2019/053182
§ 371 (c)(1),
(2) Date: Oct. 15, 2020

(87) PCT Pub. No.: WO2019/207424
PCT Pub. Date: Oct. 31, 2019

(65) Prior Publication Data
US 2021/0170501 A1    Jun. 10, 2021

(30) Foreign Application Priority Data

Apr. 23, 2018    (IT) .................... 102018000004792

(51) Int. Cl.
*E01B 31/24* (2006.01)
*B23B 45/00* (2006.01)
(Continued)

(52) U.S. Cl.
CPC ............. *B23B 45/001* (2013.01); *B25F 5/02* (2013.01); *E01B 31/06* (2013.01); *E01B 31/24* (2013.01); *B23B 2260/024* (2013.01)

(58) Field of Classification Search
CPC .......... B25F 5/02; B25F 5/021; B23B 45/001; B23B 2260/024; E01B 31/06;
(Continued)

(56) References Cited

U.S. PATENT DOCUMENTS 8,636,376 B2 *    1/2014    Van Gestel ............. B25F 5/021
                                                          362/120

FOREIGN PATENT DOCUMENTS

CN        105862527    *    8/2016    ............. E01B 31/06
DE        287740 C          10/1915
(Continued)

*Primary Examiner* — Stephen F. Gerrity
*Assistant Examiner* — Linda J Hodge
(74) *Attorney, Agent, or Firm* — Blank Rome LLP (57) ABSTRACT

A drill (1) for drilling railway sleepers comprises a support structure (2), a motor unit (3) supported by the support structure (2), a handle (4) connected to the support structure (2), at least one control member (5) arranged at the handle (4) for actuating the motor (3), a spindle (7) supported by the support structure (2) and operable by the motor (3), to rotate about a spindle axis (16), wherein a drilling tip (8) can be coupled to said spindle, a protective casing (11) connected to the support structure (2) and sliding in the direction of the spindle axis (16) between an axially protracted position, in which it envelops the tip (8) and an axially retracted position, in which the tip (8) protrudes from the protective casing (11), wherein the handle (4) comprises two gripping portions (36, 37), for the user's two hands, situated on two diametrically opposite sides of the drill (1) with respect to the spindle axis (16), and the motor unit (3) comprises an electric motor which can be powered by means of a rechargeable and replaceable battery (6).

18 Claims, 9 Drawing Sheets

(51) Int. Cl.
  *B25F 5/02* (2006.01)
  *E01B 31/06* (2006.01)
(58) Field of Classification Search
  CPC ............. E01B 31/24; Y10T 279/17811; Y10T 408/5653; Y10T 408/56245; Y10T 408/5583; Y10T 83/828; Y10S 408/71; B23Q 17/2404; B25B 23/18; F21V 33/0084; F21W 2131/403; F21L 4/02
  USPC .............................. 362/89, 119, 120; 408/21
  See application file for complete search history.

(56) References Cited

FOREIGN PATENT DOCUMENTS

| | | | | |
|---|---|---|---|---|
| DE | 202004008462 | * | 10/2005 | ........... B23B 45/001 |
| DE | 202013103023 | * | 10/2013 | ........... B23B 45/001 |
| DE | 202014005704 | * | 10/2015 | ................ B25F 5/02 |
| EP | 0 863 257 A2 | | 9/1998 | |
| EP | 3480359 | * | 5/2019 | ............. E01B 31/06 |
| GB | 2503579 | * | 1/2014 | ........... B23B 45/001 |
| JP | S50-125196 U | | 10/1975 | |
| KR | 200172226 | * | 3/2000 | ............. E01B 31/06 |
| KR | 101841194 | * | 5/2018 | ........... B23B 45/001 |
| WO | WO-2016170476 A1 | * | 10/2016 | ........... B23B 41/006 |

\* cited by examiner

DRILL FOR DRILLING RAILWAY SLEEPERS

The present invention relates to a drill for drilling railway sleepers.

As is known, railway tracks made of steel are supported and maintained at a constant distance, the so-called gauge, by means of sleepers, made of reinforced concrete or wood.

The connection of the tracks to the sleepers, in particular made of wood, usually occurs indirectly, by connecting the track to a plate by means of anchoring bolts and connecting the plate to the sleeper by means of fastening pins.

To make the holes for anchoring the fastening pins in the sleepers, it is necessary to use special hole-drilling machines which are designed for this specific purpose, operating along the tracks of a railway line.

Generally, the weight and size of these machines are considerable and such that they present difficulty for transport.

In particular, machines are commonly known which, by virtue of their size, are provided with a trolley for moving on the tracks, like machines which need special supports to be able to be activated and/or stored.

These hole-drilling machines of the known type commonly use helicoidal tips provided with a front self-threading element, by virtue of which the tip penetrates the material (wood) in a quick, but usually poorly controllable manner, with the risk of the helicoidal tip blocking in an intermediate step of the drilling, due to the possible presence of knots in the wood.

If the drilling operations are carried out on live sections, i.e. affected by railway traffic, should the tip of the drilling machine be planted in the sleeper in an intermediate step of the drilling, it is indispensable to be able to evacuate the work area quickly if a train were to approach. In this regard, it must be noted that the operation of removing the tip from the hole in the sleeper is lengthy and not immediate.

Thus, the need is felt to be able to detach the tip from the hole-drilling machine in the event of an emergency (sudden arrival of a train) to avoid having to abandon the drill with the risk of destroying the same and potentially damaging the train.

A further need of hole-drilling machines for railway sleepers consists of reducing the risk of the helicoidal tip accidentally being able to come into contact with a part of the operator's body, with the consequent hazard of accidents at work.

A drill for drilling railway sleepers of the prior art which satisfies at least some of the needs presented, at least in part, is described in EP0863257A, which can be considered the closest state of the art for the present invention.

A further requirement which is not met by drills for railway sleepers of the prior art concerns the reduction of noise, vibrations and pollution of the working environment to which the user is exposed, which is caused, at least in part, by the combustion engines which actuate the drill.

A further difficulty of working along railway lines far from inhabited areas is the absence of a power network as a source of energy for various site functions, for example, for lighting.

An even further requirement which is not met by drills for railway sleepers of the prior art concerns improving visibility in the area of making the holes in the sleepers, both at night and inside unlit tunnels, both due to the shadows caused by the dimensions of the drill and by the posture of the user, who is partially above and partially at the side with respect to the work area.

An even further requirement which is not met by drills for railway sleepers of the prior art concerns improving their ergonomics and the posture of the user, who, besides having to contrast the moment which resists the rotation of the helicoidal tip of the drill, must balance the weight of the drill in the vertical drilling position and, at the same time, have his/her field of vision facing the work area with his/her hands in a condition to operate and switch off the drill, all of this with continuous repetition of the same working posture.

An even further requirement which is not met by drills for railway sleepers of the prior art concerns their use both as a tool supported and actuated by hand, and as a tool supported by a tool holder rail cart, supported on the track, without complex operations of adaption and assembly.

An even further requirement which is not met by drills for railway sleepers of the prior art concerns the reduction of downtimes caused by inspections of operating states, the need for unplanned maintenance, configuration and reconfiguration of the operation of the drill, depletion or faults of the drilling energy source, operating faults or errors and their identification and diagnosis.

An even further requirement which is not met by drills for railway sleepers of the prior art concerns the possibility of verifying the correct execution of the drilling, directly in situ, with the planned execution parameters, for example, the number of turns of the tip.

An even further requirement which is not met by drills for drilling railway sleepers of the prior art is that of providing users with information for intuitive operation and which is such that it avoids incorrect use.

An even further requirement which is not met by drills for drilling railway sleepers of the prior art is that of having a drill which is intrinsically safe, i.e. with an operating strategy which is such that it reduces the risk of unplanned use and the risk of lesions to the user.

An even further requirement which is not met by drills for drilling railway sleepers of the prior art is that of making holes in weather conditions or environmental conditions where water, sand, particles of soil or snow fall, or are carried, to the drill area, where they are sucked in by the drill's cooling system, or penetrate connections and electric circuits with the risk of damaging the drill and harming the operator. The most typical prohibitive weather conditions or environmental conditions include rain, storms, wind in the presence of dust, sand and water.

Thus, it is an object of the present invention to produce a drill for drilling sleepers, particularly for use in the railway sector, having such features as to overcome at least some of the described drawbacks, with reference to the prior art.

These and other objects are achieved by means of a drill for drilling railway sleepers according to the present invention and the preferred, advantageous embodiments described below.

A description of preferred, non-limiting embodiments will be provided below, with reference to the drawings, wherein.

With reference to the figures, a drill 1 for drilling railway sleepers (not shown), comprises a support structure 2, preferably a main plate, a motor unit 3, supported by the support structure 2, a grip or a handle 4 connected to the support structure 2, and one or more control members 5 arranged on the handle 4 to control the motor 3.

A protective casing 11 is connected to the support structure 2, at its lower end, opposite the motor 3, which protective casing completely surrounds both a spindle 7 and a helicoidal tip 8 (sketched in FIGS. 4, 5) connected thereto. The helicoidal tip 8 is preferably of the type equipped with a front self-threading element.

The spindle 7 is operable by the motor 3 by means of the drive shaft 9 and, optionally, a reducer 10, for example, a cogwheel or a belt and adapted to transmit the rotation of the drive shaft 9, with the desired gear ratio, to the spindle 7.

The protective casing 11 comprises a fixed casing portion 12 and a movable casing portion 13. The movable casing portion 13 is designed to rest in the drilling area against the sleeper. To this end, the movable casing portion 13 has a tapered shape at its end section 14 and can end in a cylindrical portion 15 adapted to engage, for example, a round hole of a connection plate, not shown.

The movable casing portion 13 is sliding with respect to the fixed casing portion 12 in an axial direction, with respect to the rotation axis 16 of the spindle 7 and the tip 8, (which constitutes a tool axis), between an axially protracted position and an axially retracted position.

According to an embodiment, the movable casing portion 13 is permanently elastically stressed towards the protracted position, for example, by means of one or more helicoidal springs 17, 18 interposed between the fixed casing portion 12 and the movable casing portion 13.

According to an embodiment, the movable casing portion 13 can be slidingly connected to two guide columns 19, 20 arranged on two diametrically opposite sides with respect to the axis 16 of the spindle 7 and extended in an axial direction, so as to guide the axial movement of the movable casing portion 13. The guide columns 19, 20 are connected at the top to the support structure 2, and the springs 17, 18 are inserted on the guide columns 19, 20.

According to one embodiment, the end section 14 of the movable portion 13 is replaceable and connectable to an upper section of the movable portion 13, preferably by means of a left-hand thread, so as to avoid unscrewing the end section 14 from the upper section on account of the friction between the tip 8, swarf, and the end section 14.

According to one embodiment, the movable casing portion 13 is constrained to the guide columns 19, 20 by means of the insertion of two tubular seats 76 on corresponding free ends of the guide columns 19, 20, provided with a quick locking and release device without the aid of equipment and devoid of threads. The quick locking and release device comprises a locking key 77 arranged at the free end of each of the guide columns 19, 20 and can be positioned, for example, by means of rotation, preferably by snap rotation, between a release position (FIG. 15), wherein the tubular seat 76 can be unthreaded from the free end of the guide column 19, 20, and a locking position (FIG. 16), wherein the unthreading of the tubular seat 76 from the free end of the guide column 19, 20 is prevented.

Figures 15A, 15B:
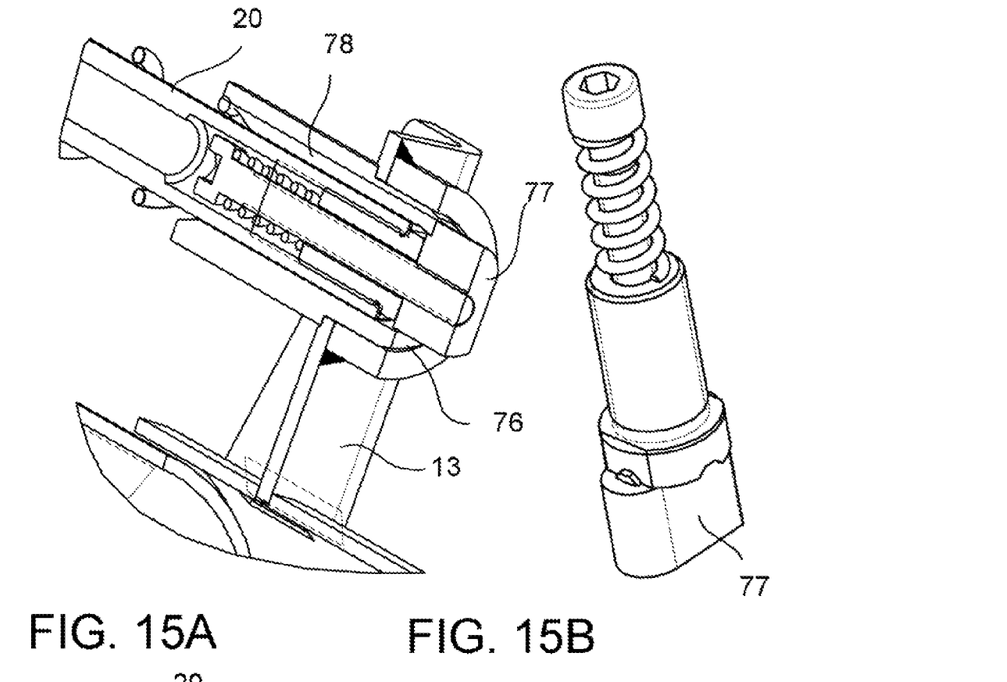
FIGS. 15A, 15B show a perspective and sectional view of details of a locking device in a release configuration.
Figures 16A, 16B:
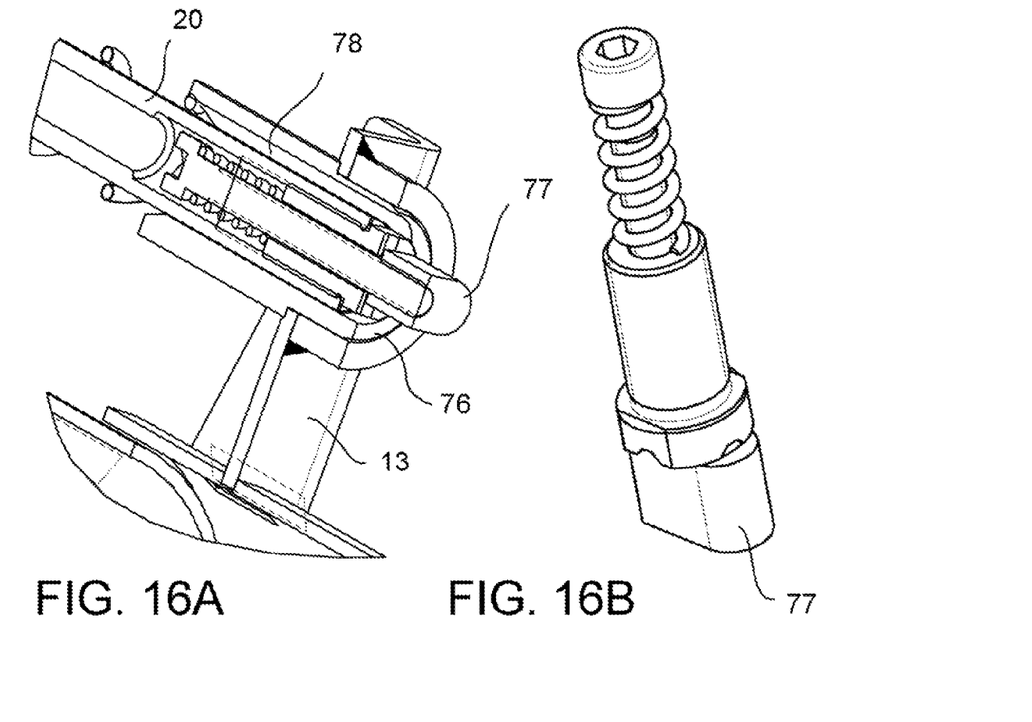
FIGS. 16A, 16B show a perspective and sectional view of details of the locking device in FIG. 15 in a locking configuration.

To this end, the tubular seat 76 can form one or more grooves 78 which allow the insertion and unthreading of the movable casing portion 13 when the locking key 77 is positioned in alignment with said one or more grooves 78, in the release position (FIG. 15). Similarly, the tubular seat 76 is shaped to interfere with the locking key 77 when the latter stops in the locking position, in order to prevent the insertion and unthreading of the movable casing portion 13 on/from the guide columns 19, 20.

The quick locking and release of the movable casing portion 13 to/from the guide columns 19, 20 facilitates and accelerates the assembly and disassembly of the movable portion 13 and, by virtue of the absence of threaded connections or locking nuts, prevents an undesired loosening, for example, of the locking nut caused by the vibrations of the drill 1.

An annular clamp 21 axially sliding and lockable in position is provided on the fixed casing portion 12, which annular clamp 21 allows the drilling depth to be determined in advance by means of a graduated scale 22 arranged on the outer surface of the fixed casing portion 12.

The locking of the annular clamp 21 takes place by means of an eccentric cam which is operable by means of a locking/release lever 23.

The drill 1 further comprises means for the quick release of the drilling tip 8.

According to one embodiment, the quick release means comprise a rod 24 arranged coaxially to the spindle 7, inside the fixed casing portion 12, and coupled to a small rod 25 arranged transversally to a bushing 26 and integral therewith. A lever 27 is adapted to be engaged with the rod 24 to cause the lifting thereof so as to be able to release the tip 8 quickly.

In detail, the lever 27 engages with a fork end 28 thereof with the rod 24, which is provided with an enlarged head 29 arranged at its upper end.

The engagement of the lever 27 with the rod 24 and the successive upward lifting thereof cause the bushing 26 to move upwards in opposition to the force of a spring 30 which is abutted between a projection of the bushing 26 and a projection of the spindle 7 which holds the tip 8.

In one embodiment, a key 31 engages the tip 8 (in a slot defined in the shank of the tip) and is forced on engagement by a spring 32. The lifting of the bushing 26 allows the tip 8 to free itself from engagement with the key 31 allowing the drill 1 to separate from the tip 8.

According to one aspect of the invention, the motor unit 3 comprises an electric motor which can be powered by means of a rechargeable and replaceable battery 6, advantageously a lithium-ion battery.

This enables a reduction in noise, vibrations and pollution in the working environment, to which the user is exposed, as well as a reduction in the weight of the drill 1 and a reduction in the risk of burns typical of combustion engines.

According to one embodiment, the electric motor 3 is positioned in an at least substantially centered manner with respect to a work plane 46, between two grip portions 36, 37 of the handle 4 and containing the rotation axis 16 of the spindle 7.

According to a further embodiment, the axis 33 of the drive shaft 9 of the electric motor 3 coincides with the spindle axis 16 or it is spaced apart from the spindle axis 16 towards the user side 41 (the side where the user is when he/she grips the drill 1 correctly).

Advantageously, a housing 34 of the electric motor 3 forms a battery seat 35 for a reversible coupling of the battery 6 by means of pushing or translational insertion, preferably in a direction of insertion facing the user side 41. This facilitates both the insertion and the removal of the battery 6.

Figure 4:
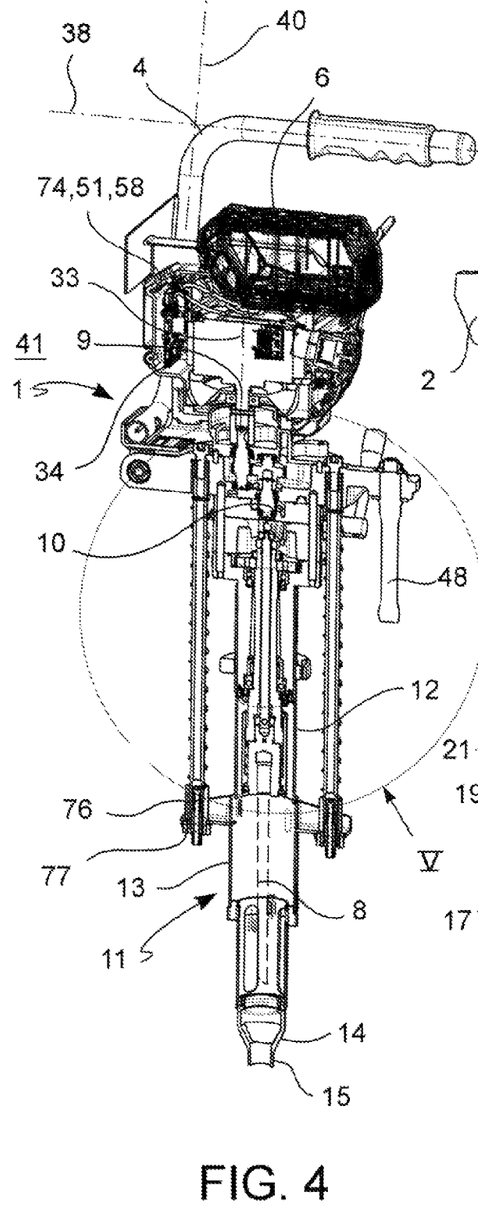
FIG. 4 is a longitudinal sectional view of the drill in FIG. 1.
Figure 5:
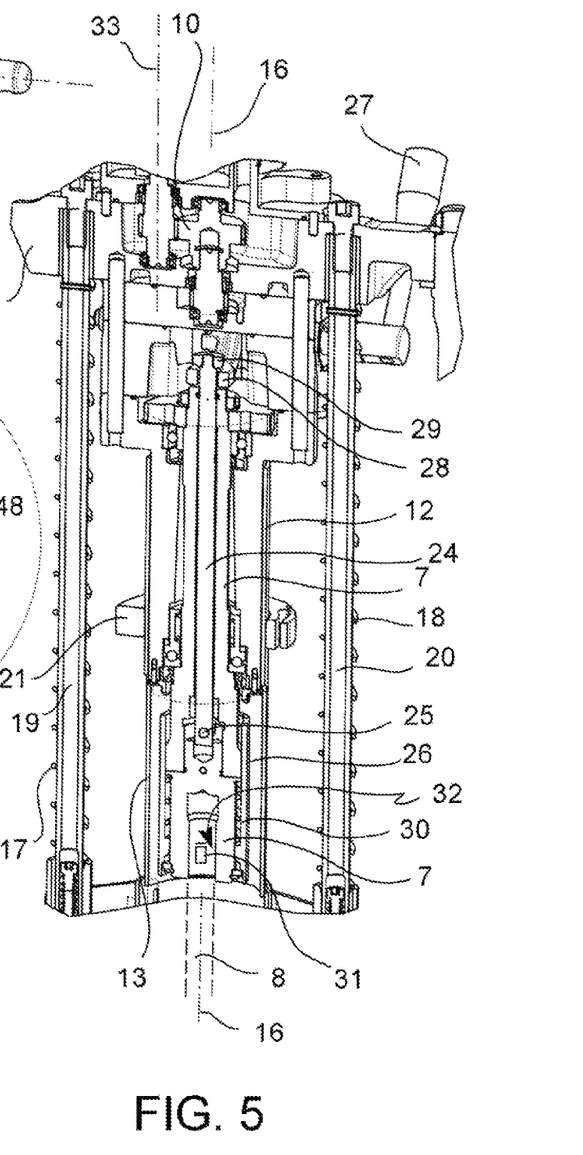
FIG. 5 is an enlargement of detail V in FIG. 4.

Advantageously, the barycenter of the battery 6 attached to the battery seat 35 is further from the user side 41 with respect to the barycenter of the electric motor 3 which is closer to the user side 41 (FIG. 4). This results in a better balancing of the masses of the drill 1 with respect to the support point thereof on the sleeper and with respect to the spindle axis 16 on which the drilling torsion acts.

With even further advantage, the battery seat 35 is formed in an upper surface of the motor housing 34 so that the battery 6 is positioned above the motor 3 and facing upwards. In this way, the battery 6 shields a part of the acoustic waves generated by the electric motor 3 and by the reduction gear in the direction of the user's head when it is in the work position.

According to a further aspect of the invention, the handle 4 comprises two opposite gripping portions 36, 37 for the user's two hands, which are situated on two diametrically opposite sides with respect to the spindle axis 16, above, and external to the vertical dimensions of the electric motor 3, and both of the gripping portions 36, 37 are extended on one same gripping plane 38, inclined by less than 15° with respect to a plane perpendicular to the spindle axis 16. The two gripping portions 36, 37 define an angle of less than 15° therebetween, or they are parallel to each other and both of the gripping portions 36, 37 are extended in a direction away from the spindle axis 16 towards one side of the drill 1 opposite the user side 4 (the side where the user is positioned with respect to the drill 1 when he/she grips the handle 4 correctly in the work position).

Each of the two gripping portions 36, 37 is formed by a portion of free end of a gripping bar 39 extended and folded in a three-dimensional manner and fixed to the support structure 2 on the user side 41 of the drill 1.

Figure 1:
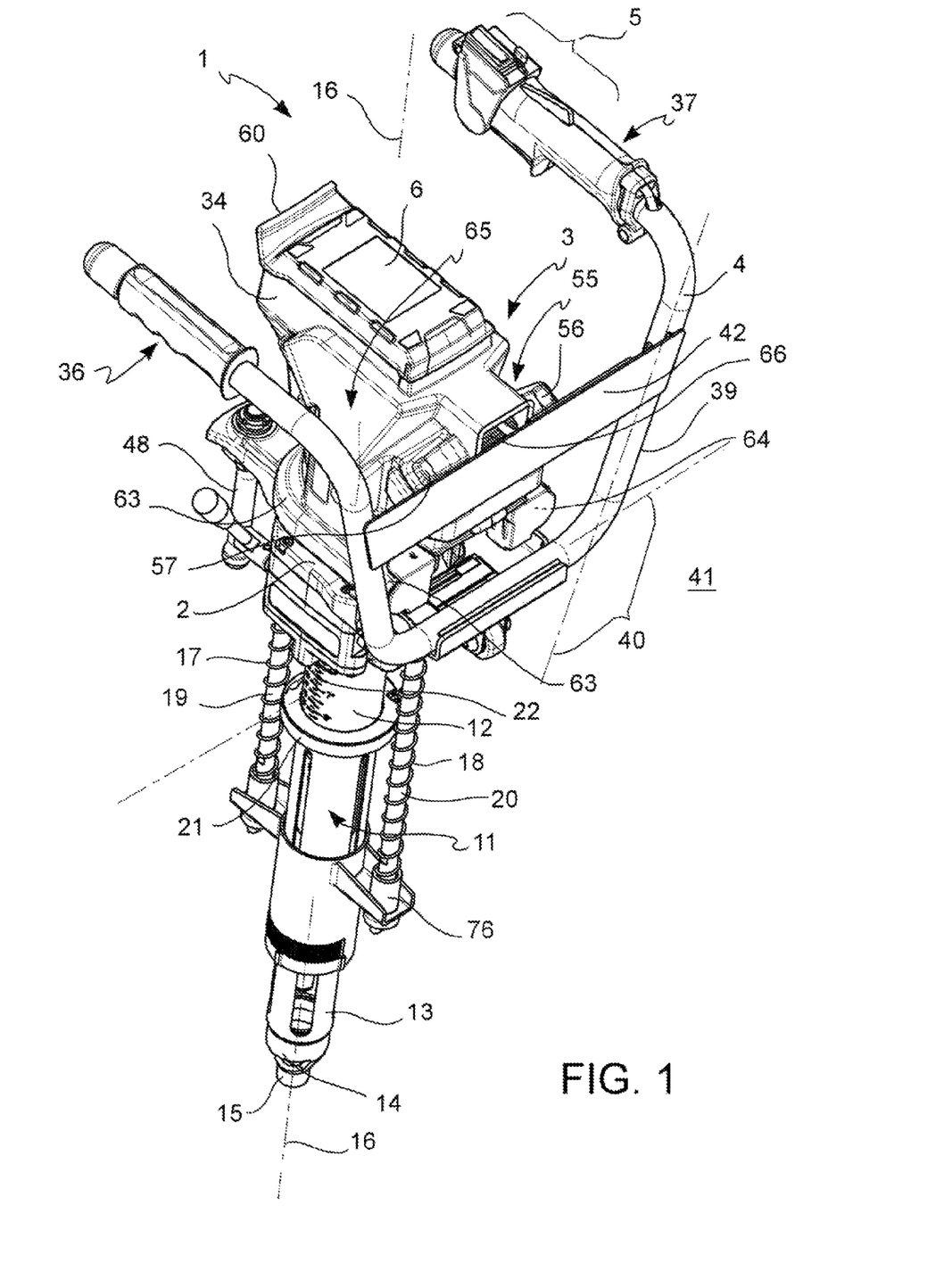
FIGS. 1, 2, 3 are perspective views of a drill according to one embodiment.
Figures 2, 3:
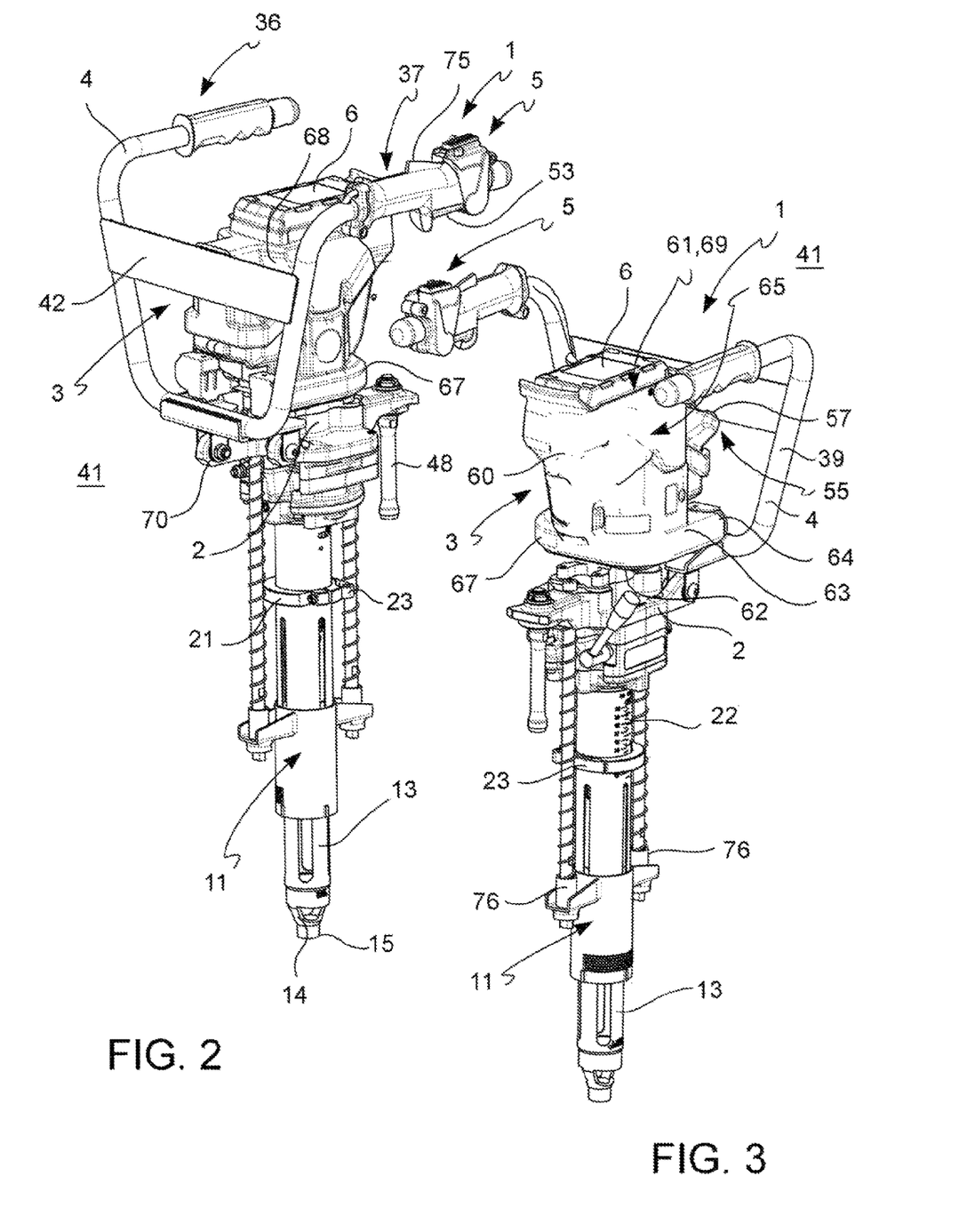
Figure 9:
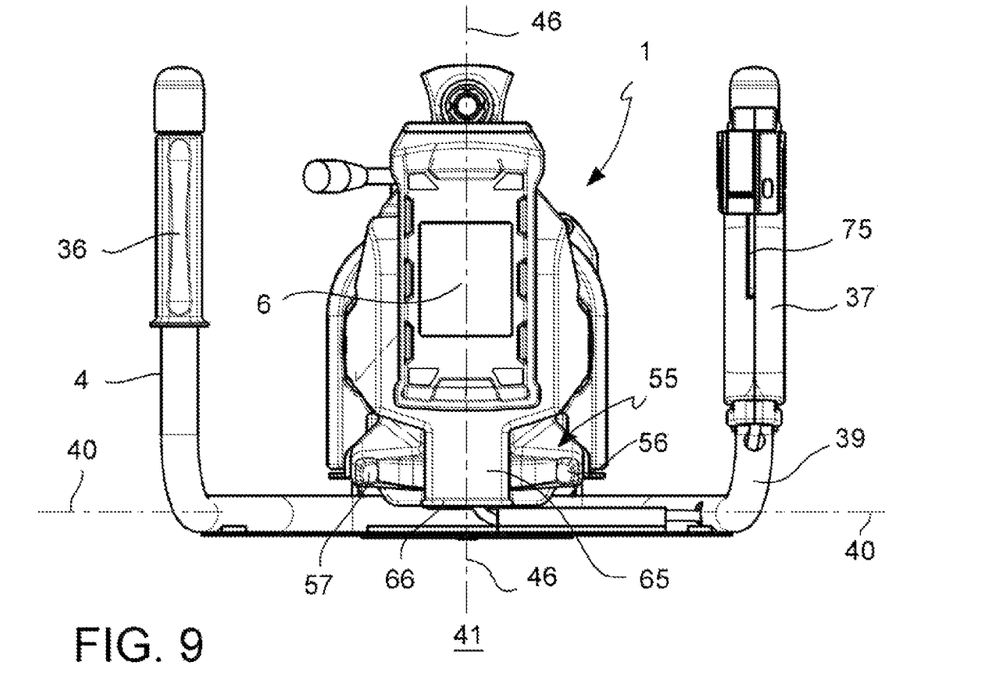
FIG. 9 is a view from above, in particular, of a handle device and an electric motor with a battery, of the drill according to one embodiment.

According to an embodiment, the gripping bar 39 is folded in the shape of a trapezium, without the larger base, wherein a first part of the trapezium containing the smaller base lies on a protection plane 40 (FIGS. 1,9) which is substantially parallel to the spindle axis 16, placed on the user side 41 of the drill 1 and wherein said free end portions forming the gripping portions 36, 37 are folded outside the protection plane 40 and extend in the aforesaid gripping plane 38.

The part of the gripping bar 39 extended in the protection plane 40 can serve to support the drill 1 and thus protect the motor 3 from damage and direct contact with the ground.

To this end, the drill 1 can further comprise a protection plate 42 welded to two lateral portions of the gripping bar 39 in the protection plane 40 at the position of the electric motor 3.

Figure 6:
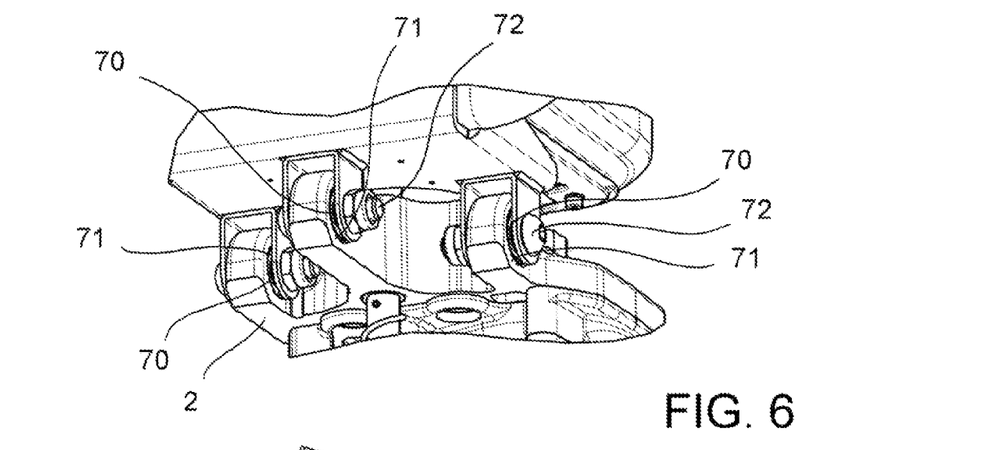
FIG. 6 shows an enlarged detail of a damping system of the drill according to one embodiment.
Figure 7:
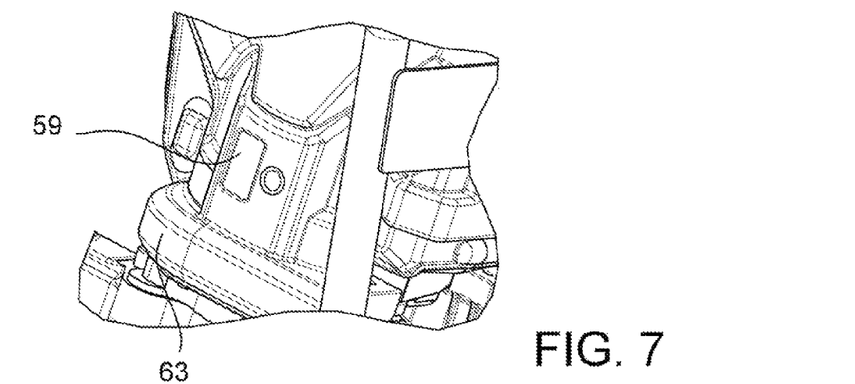
FIG. 7 is an enlargement of a display area of the drill according to one embodiment.
Figure 8:
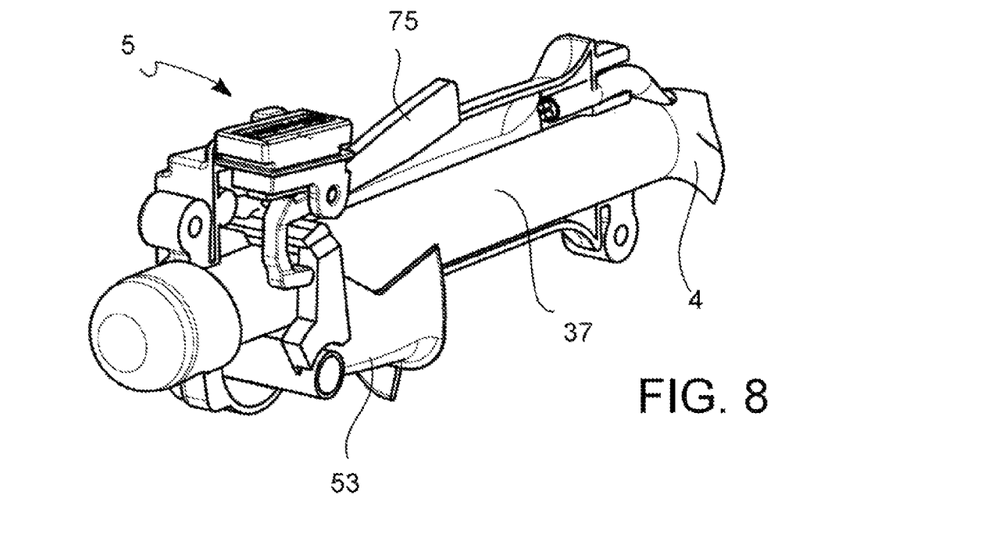
FIG. 8 is an enlargement of an area for gripping and manually controlling the drill according to one embodiment.

According to a further embodiment, the handle 4, in particular the gripping bar 39, is connected to the support structure 2 by means of the interposition of one or more damping elements 70 (FIG. 6). Advantageously, the support structure 2 forms three connection holes 71 and the handle 4 is connected to the support structure 2 by means of three pins 72 inserted into the connection holes 71 by means of the interposition of said annular damping elements 70.

This decreases the transmission of vibrations from the drill 1 to the operator's hands, reducing fatigue and the risk of work-related pathologies.

Thus configured, the handle 4 improves the ergonomics of the drill 1 and the user's posture, besides contributing to more easily contrasting the moment which resists the rotation of the tip 8 and balancing the weight of the drill 1 in the vertical drilling position.

According to a further aspect of the invention, the drill 1 comprises a lighting system 43 with two light sources 44, 45 which are spaced apart from each other and arranged on two opposite sides with respect to a hypothetical vertical work plane 46 containing the spindle axis 16. The two light sources 44, 45, preferably two LEDs, or two LED groups, generate two lit fields (cones) which overlap, at least in a drilling region 47 of the drill 1, wherein such overlapping of the two lit cones extends, preferably axially, along the whole travel of the movable casing portion 13 between its protracted position and its retracted position.

The presence and the particular configuration of the lighting system 43 improve the visibility of the drilling region 47 and reduce the formation of shadows in such region.

In an embodiment, the light sources 44, 45 are arranged at the aforesaid gripping portions 36, 37, preferably at the free ends of the gripping portions 36, 37 or on the side thereof facing away from the user in the position of use.

This allows an unobstructed development of the two respective light cones, starting from the top and from the side opposite the user side, developing downwards, with a slight distancing towards the user side and towards the spindle axis 16, thus avoiding the formation of shadows, providing the user with improved visibility conditions.

In fact, one of the advantageous aspects of the lighting system 43 is that the optical axes of the two light cones of the light sources 44, 45 are mutually converging in an axial direction towards the tip 8 of the drill 1 and they converge together from the side opposite the user side 41 towards the spindle axis 16.

The drill 1 lighting system 43 improves visibility in the area where the holes are made in the sleepers, both at night and inside unlit tunnels, and to prevent the operator's eyes from fatigue while making the holes.

Figure 14:
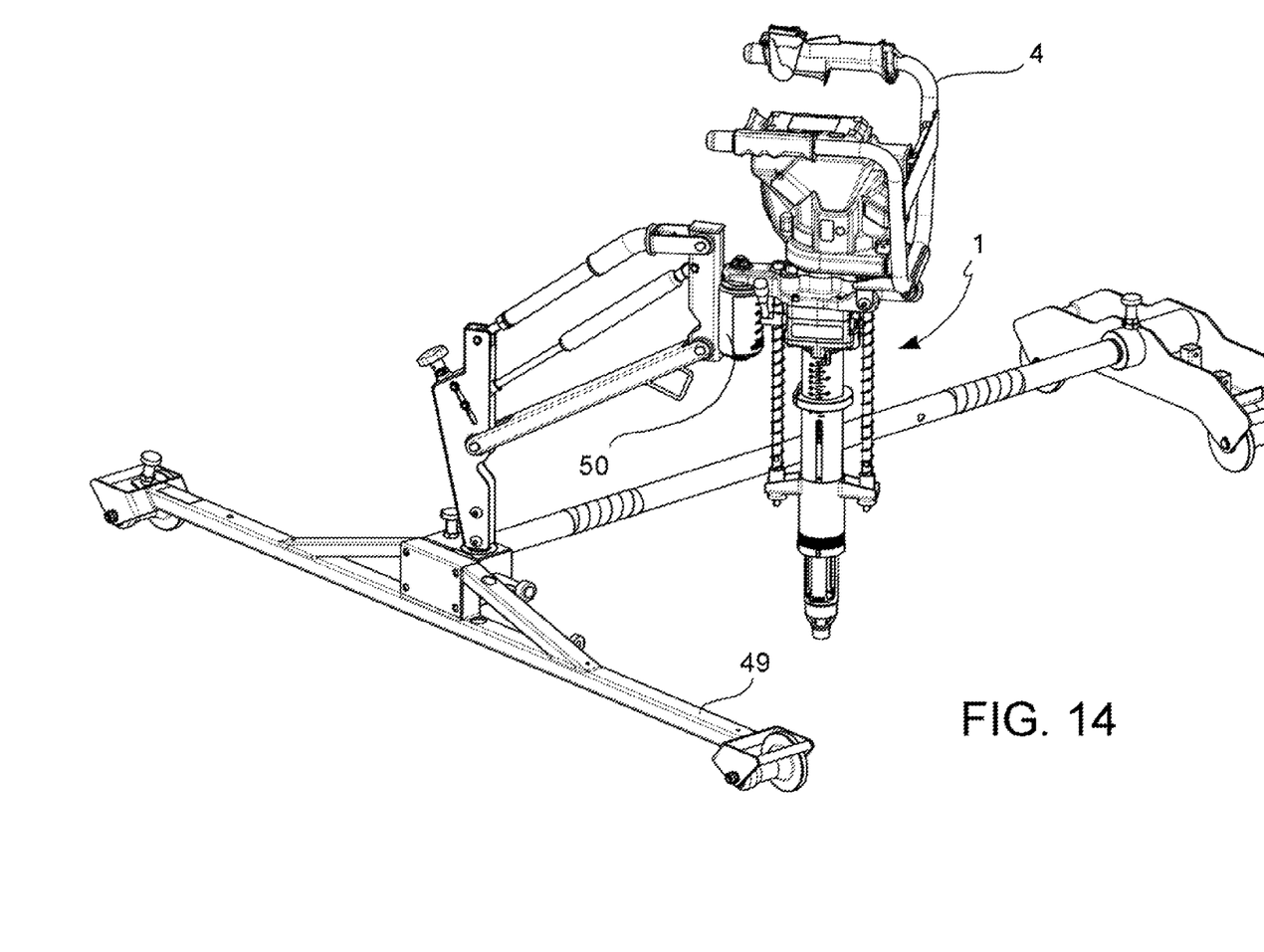
FIG. 14 is a perspective view of the drill coupled to a tool holder rail cart.

According to a further aspect of the invention, the drill 1 for drilling sleepers comprises a quick coupling interface 48 for a coupling of the drill 1, without the aid of equipment, to a tool holder rail cart 49 (FIG. 14).

According to an embodiment, the quick coupling interface 48 forms a coupling by means of engagement or translational insertion along a coupling direction parallel to the spindle axis 16. In the position of use of the drill 1, this forms a coupling in a vertical direction, which is thus assisted and maintained also by virtue of the force of gravity.

According to an embodiment, the quick coupling interface 48 comprises a coupling pin positioned on the side opposite the user side 41, and having a first upper end connected to the support structure 2 and a second lower end protruding freely in an axial direction, adapted to be inserted into a corresponding vertical tubular seat 50 of the tool holder rail cart 49.

This allows a quick and easy switching of the drill 1 for a hand supported use and for a use supported by a tool holder rail cart 49.

Advantageously, the coupling pin 48 is substantially positioned at the same height as the barycenter of the drill 1 along the spindle axis 16, but transversely spaced apart from the spindle axis 16. This allows a particularly stable, balanced positioning during the use of the drill 1 with the tool holder rail cart 49, but also the use of the coupling pin 48 as a handle for the manual transportation of the drill 1, with an optimal balancing of the weight thereof. In this regard, the coupling pin 48 is advantageously sized with the same size order as the gripping portions 36, 37.

The drill 1 comprises an electronic control unit 51 in connection with the rechargeable battery 6, the electric motor 3, the lighting system 43, and with the activation/manual control members 5 of the electric motor 3 and, if provided, with further signaling, monitoring or control means, which will be described later on.

In an embodiment, the manual control members 5 comprise a three-stable-position switch 52 and an operating button 53, the three-position switch 52 can be positioned in a first stable "drilling" position, in a second stable "off" position and in a third stable "reverse rotation" position for selecting the actuation mode of the motor 3 (with forward rotation to make a hole, with backward rotation in the reverse direction to remove the tip 8 from the hole made and to switch off the drill 1).

The operating button 53 can be operated manually to operate the motor 3 according to the mode selected by means of the three-position switch 52. The control unit 51 is configured so that:

in the absence of actuation of the operating button 53 the motor 3 is not operated,
with the operating button 53 maintained actuated and with a successive switching of the three-position switch 52 from the stable "off" position to the stable "drilling" position or to the stable "reverse rotation" position, the motor 3 is not operated.

According to a further embodiment, the control unit 51 is configured so that:

with the drill 1 initially off, the switching of the three-position switch 52 into the first stable "drilling" position or into the third stable "reverse rotation" position turns the control unit on 51 in standby mode, ready for operation,
with the control unit 51 on and in standby mode, the control unit 51 automatically switches off if the operating button 53 is not actuated for a predetermined maximum standby period, which can be fixed or adjustable, for example, in the range from 60 seconds to 600 seconds,
with the drill 1 off, on conclusion of the maximum standby period, the drill 1 can be turned on again in standby mode by means of a switching of the three-position switch 52 first into the second stable "off" position and then into one of the stable "drilling" and "reverse rotation" positions.

This enables the drill 1 to be operated with maximum safety.

Figure 10:
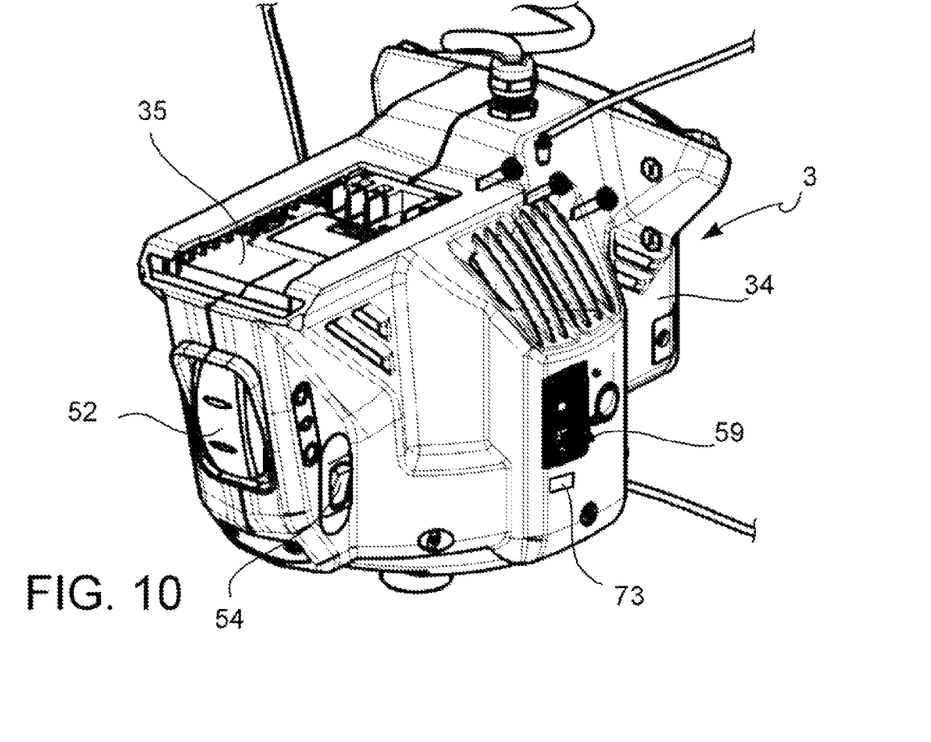
FIG. 10 is a perspective view of an electric motor of the drill according to one embodiment.
Figure 11:
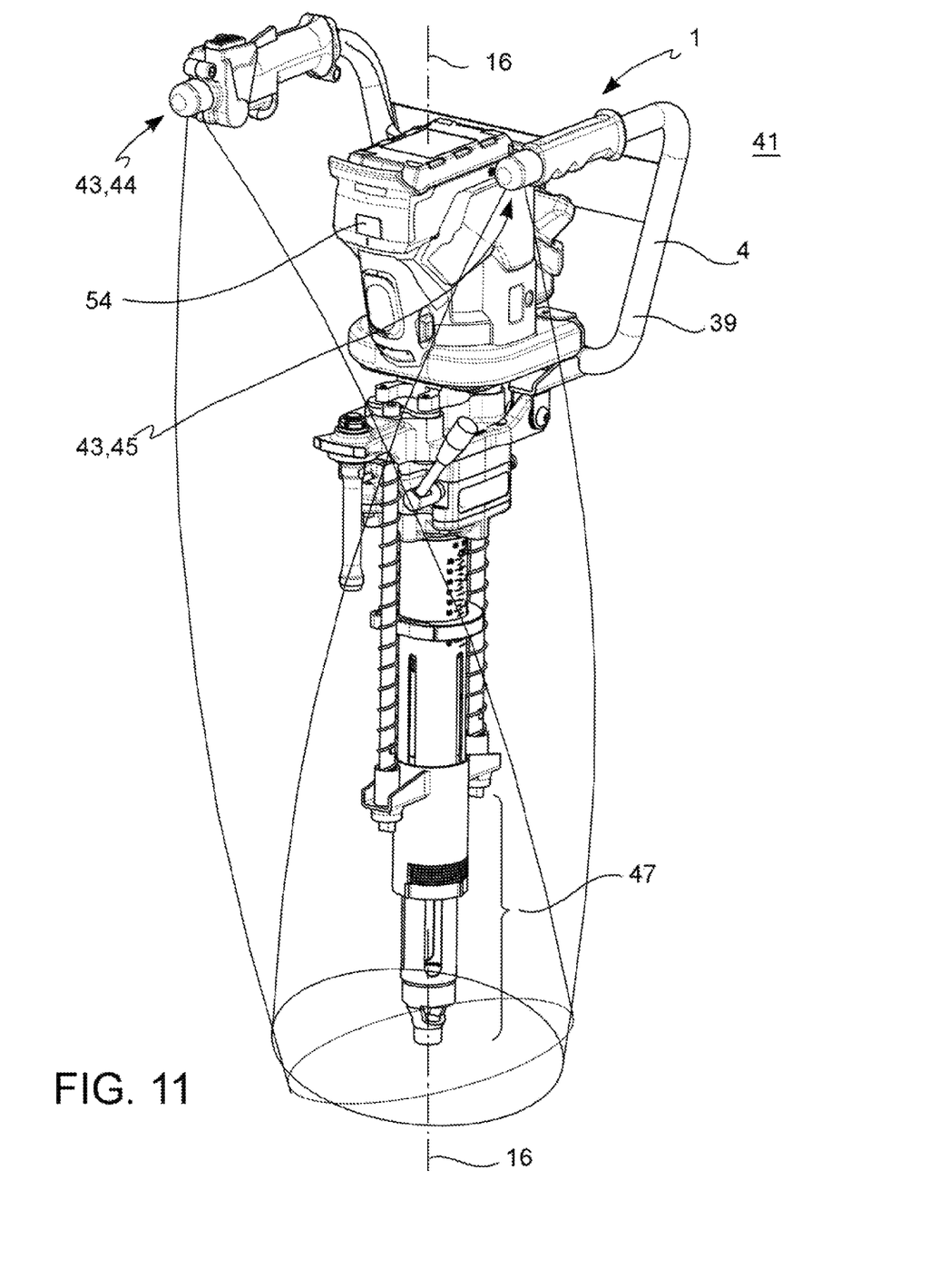
FIG. 11 is a perspective view of the drill with an activated lighting system, according to one embodiment.
Figure 12:
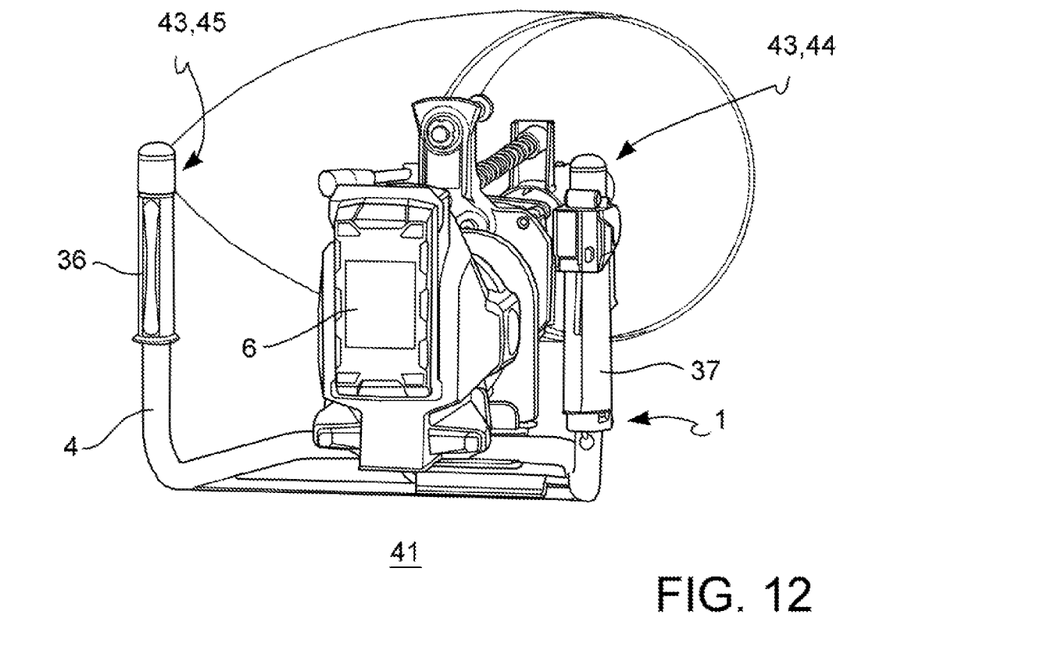
FIG. 12 is a view from above of the drill showing the light cone made by a lighting device placed on the left side of the drill.
Figure 13:
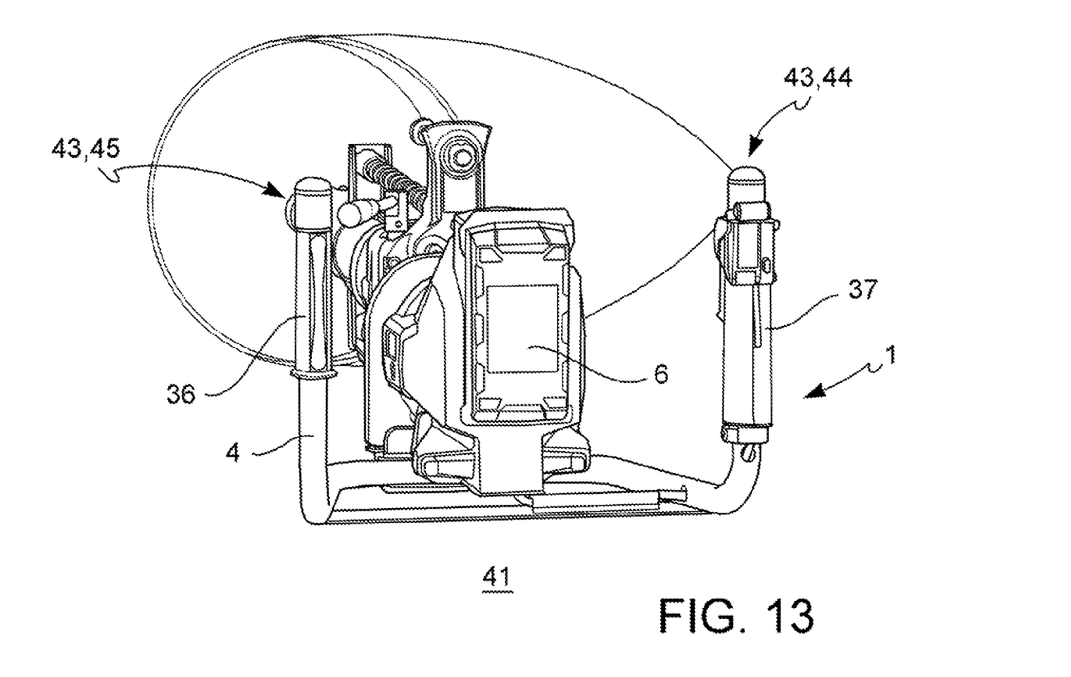
FIG. 13 is a view from above of the drill showing the light cone made by a lighting device placed on the right side of the drill.

Advantageously, the operating button 53 is positioned at the handle 4, immediately close to one of the gripping portions 36, 37 which are held by the user's hands. Instead, the three-stable-position switch 52 is advantageously positioned in an unreachable position by the user's hand on seizing the gripping portion 36, 37, preferably at the motor housing 34 (FIG. 10).

According to a further embodiment, the drill 1 comprises a mechanical locking member 75, positioned at at least one of the two gripping portions 36, 37 and configured to allow the actuation of the operating button 53 only when the user grips the gripping portion 36, 37, and thus the drill 1, correctly, with his/her hand.

The control unit 51 can further be configured to activate the lighting system 43 automatically as a function of the activation of the drill 1 by means of the three-position switch 52 and, possibly, to deactivate the lighting system 43 automatically on switching off the drill 1, for example, on conclusion of the maximum standby period or after positioning the three-position switch 52 in the second stable "off" position.

Alternatively or additionally, the lighting system 43 can comprise a lighting switch 54 for the voluntary switching on and off of the lighting system 43.

Advantageously, the lighting system 43 is switched on automatically during operation of the motor 3 in "drilling" mode and in "reverse rotation" mode and it remains on after the motor 3 has been switched off for a predetermined post-drilling inspection period, for example, 10 seconds.

According to a further aspect of the invention, the drill 1 can comprise a light indicator 55 of the set rotation direction of the motor 3. According to an embodiment, the light indicator 55 comprises a first light indicator 56, for example, LED, arranged on a first side of the drill 1, the lighting up of which indicates a rotation setting of the motor 3 in the drilling direction, and a second light indicator 57, for example, LED, arranged on a second side of the drill 1, opposite the first side, the lighting up of which indicates a rotation setting in the reverse direction for removing the tip 8.

Advantageously, in the position of use of the drill 1 and in the user work position, the first light indicator 56 and the second light indicator 57 are both opposite the user, one on his/her right and the other on his/her left, by analogy with car light direction indicators. This provides an immediate and highly intuitive indication of the set rotation direction, both before actuation of the motor 3 by means of the operating button 53 and during actuation of the motor 3.

According to one preferred embodiment, the light indicators 56, 57 are controlled by the control unit 51 to light up, according to the rotation mode selection of the motor 3, green in color and in the absence of operating faults, and red and optionally flashing, in the case of operating fault.

The rotation direction indicator 55, which also serves the function of signaling faults by virtue of the analogy thereof with car light indicators, contributes to increasing the user's ability to concentrate and reducing reaction times in the case of a fault.

According to a further embodiment, the electronic control unit 51 also comprises a memory 58 positioned inside the drill 1 configured to memorize, in such memory 58, drill operating parameters, for example, the number of hours of operation, in particular, the number of hours of operation in "drilling" mode and in "reverse rotation" mode.

According to a further embodiment, the drill 1 also comprises a display 59 controlled by the control unit 51 so as to display drill 1 operating parameters.

The display 59 is arranged on an outer surface of the housing 34 of the motor 3, preferably on a lateral side facing away from the user's view in a work position, so as not to distract the user's attention during the drilling of the sleeper.

The parameters displayed by means of the display 59 comprise, for example, one or more from:
- a battery charge state,
- hours of operation,
- remaining hours of operation until maintenance is required,
- rotation direction of the motor,
- rotational speed (number of turns) and the spindle 7,
- name or series number of the drill,
- drill control firmware version,
- possible operating faults or errors, for example
- over-torque warning requested from the motor,
- battery undervoltage warning,
- battery overheating warning,
- an incorrect motor power supply warning (which may arise, for example, in the case of inserting the battery with the three-position switch 52 not in the "off" position, or in the case of inserting an unsuitable battery).

The control unit 51 further comprises a connection interface 73, for example, a miniUSB port, for a connection thereof to an external electronic device, for example, a computer, for updating the drill 1 control firmware.

According to a further embodiment, the control unit 51 comprises a transmission and wireless reception interface 74 for a transmission of data, in particular, operating parameters, with an external electronic device to the drill 1.

With a further advantage, the control unit 51 can comprise one or more from:
- a GSM communication module for a data connection to the GSM mobile phone network,
- a localization device of the position thereof,
- a satellite localization device of the position thereof (GPS).

The drill 1 control and display system is intrinsically safe and contributes to a reduction in downtimes caused by inspections of operating states, the need for unplanned maintenance, configuration and reconfiguration of the operation of the drill 1, depletion or faults of the battery 6, operating faults or errors and the identification and diagnosis thereof.

The control and display system further improves the correct making of the drilling directly in situ with the planned execution parameters, for example, planned number of turns.

According to a further embodiment, the drill 1 comprises a sheath (60) made of flexible elastomeric material, which is liquid-proof and of a generally tubular shape, with a front opening (61) and a rear opening (62), opposite the front opening (61), in the direction of the spindle axis (16), so as to be insertable over the electric motor (3) and over at least a part of the battery (6) to protect them.

The sheath (60) forms a ventilation channel (63) with at least a first inlet opening (64) obtained in an outer surface of the sheath (60) and facing horizontally or downwards, and with an inner ventilation portion (67) which is concave and open towards the interior of the sheath (60) so as to communicate cooling air from the inlet opening (64) to a cooling system of the motor (3).

According to one embodiment, the ventilation channel (63) comprises one or more intake filters (45).

According to a further embodiment, the sheath 60 forms a discharge channel (65) with at least one outlet opening (66), obtained in an outer surface of the sheath (60) and facing in a horizontal direction or downwards, with an inner discharge portion (68) which is concave and open towards the interior of the sheath (60) so as to be able to receive air expelled by the motor 3 cooling system and discharge it through the outlet opening (66).

The inner discharge portion (68) can comprise two opposite lateral cavities, formed in two side walls of the sheath (60) and in communication with the at least one outlet opening (66). The discharge channel (65) can also comprise one or more filters.

The ventilation (63) and discharge (65) channels are mutually spaced apart so as to prevent, or hinder the intake of air from the discharge channel (65) into the ventilation channel (63).

Advantageously, the sheath 60 forms a battery opening (69) positioned at the battery (6) of the drill (1) to allow the coupling and uncoupling and the removal of the battery (6) from the drill (1) through the battery opening (69), without needing to remove the sheath (60) from the drill (1).

The sheath 60 also enables holes to be made in sleepers in environmental conditions or weather conditions where water, sand, particles of soil or snow are present.

The invention claimed is:

1. A drill for drilling railway sleepers, comprising:
   - a support structure,
   - a motor assembly supported by the support structure,
   - a handle connected to the support structure,
   - at least one control member arranged on the handle for operating the motor,
   - a spindle supported by the support structure and operable by the motor to rotate about a spindle axis,
   - a protective casing connected to the support structure and surrounding both the spindle and a drilling tip coupled to said spindle, said protective casing comprising a movable casing portion sliding in the direction of the spindle axis between an axially protracted position, in which it envelops the tip, and an axially retracted position, in which the tip protrudes out from the protective casing,
   wherein:
   - the handle comprises two gripping portions for the two hands of the user, located on two diametrically opposite sides of the drill with respect to the spindle axis, the two gripping portions each having a free end, and
   - the motor assembly comprises an electric motor, which can be powered by a rechargeable and replaceable battery; and
   wherein the drill further comprises:
   - a lighting system with two light sources arranged at the free ends of the gripping portions facing away from the user in a use position of the drill, the two light sources being spaced apart from each other and arranged on two opposite sides with respect to a hypothetical work plane containing the spindle axis, wherein optical axes of two light cones generated by the light sources mutually converge in an axial direction towards the tip and converge together towards the spindle axis from a side of the drill opposite the user, forming two illuminated fields overlapping at least in a drilling region of the drill, wherein said overlapping of the two illuminated fields axially extends along a complete stroke of a free end of the movable casing portion between the protracted position and the retracted position.

2. The drill according to claim 1, wherein the electric motor is positioned substantially centrally with respect to a work plane between the two gripping portions of the handle and containing the spindle axis.

3. The drill according to claim 1, wherein a housing of the electric motor forms a battery seat for a reversible coupling of the battery by translational insertion in an insertion direction facing a user side, and the barycenter of the battery attached to the battery seat is further away from the user side than the barycenter of the electric motor, which is closer to the user side.

4. The drill according to claim 3, wherein the battery seat is formed in an upper surface of the motor housing so that the battery is positioned above the motor and facing upwards.

5. The drill according to claim 1, wherein the two gripping portions are positioned above and outside the vertical extension of the electric motor, and both gripping portions extend in the same handle plane, inclined by less than 15° with respect to a plane perpendicular to the spindle axis, and the two gripping portions define an angle of less than 15° therebetween or are mutually parallel, and both gripping portions extend in a direction away from the spindle axis towards one side of the drill opposite the user side where they form free ends,
 wherein each of the two gripping portions consists of a free end portion of a handle bar extending and folded in a three-dimensional manner and fixed to the support structure on the user side of the drill, and
 wherein the handle bar is folded in the shape of a trapezium without the larger base, wherein a first part of the trapezium containing the smaller base lies on a protection plane substantially parallel to the spindle axis and placed on the user side of the drill, and wherein said free end portions forming the gripping portions are folded out of the protection plane and extend in said handle plane.

6. The drill according to claim 1, wherein the handle is connected to the support structure by the interposition of one or more damper elements.

7. The drill according to claim 6, wherein the support structure forms three connection holes and the handle is connected to the support structure by means of three pins inserted into the connection holes by the interposition of said damper elements which are annular.

8. The drill according to claim 1, comprising a quick coupling interface for coupling the drill, without the aid of tools, to a tool holder rail cart, wherein said quick coupling interface forms a coupling by translational insertion along a coupling direction parallel to the spindle axis on the side opposite the user side.

9. The drill according to claim 1, comprising an electronic control unit in connection with the rechargeable battery, the electric motor and the control members,
 wherein the control members comprise a three-stable-position switch with three stable positions and an operating button, and
 wherein the three-position switch can be positioned for selecting the actuation mode of motor in:
 a stable drilling position,
 a stable off position,
 a stable reverse rotation position,
 wherein the operating button is operable for operating the motor according to the mode selected by means of the three-position switch,
 wherein the control unit is configured so that in the absence of actuation of the operating button, the motor is not operated.

10. The drill according to claim 9, wherein the control unit is configured so that:
 with the drill initially off, the switching of the three-position switch into the stable drilling position or into the stable reverse rotation position turns the drill on in standby mode, ready for operation,
 with the drill on and in standby mode, the drill automatically switches off if the operating button is not actuated for a predetermined maximum standby period, which can be fixed or adjustable,
 with the drill off, upon conclusion of the maximum standby period, a switching of the three-position switch first into the stable off position and then into one of the stable drilling or reverse rotation positions switches the drill back on in standby mode.

11. The drill according to claim 10, wherein the operating button is positioned at the handle close to one of the gripping portions and the three-position switch is positioned in a position unreachable by a user's hand holding the gripping portion.

12. The drill according to claim 9, comprising a mechanical locking member protruding from at least one of the two gripping portions so as to be pressed when a user correctly grasps said gripping portion with his/her hand and releases the operating button only when the mechanical locking member is pressed.

13. The drill according to claim 9, comprising a light indicator of the set rotation direction of the spindle, wherein the light indicator comprises:
 a first light indicator arranged on a first side of the drill, wherein lighting of the first indicator indicates a rotation setting in the drilling direction,
 a second light indicator arranged on a second side of the drill opposite the first side, wherein lighting of the second indicator indicates a rotation setting in the reverse direction for removing the tip from the hole.

14. The drill according to claim 13, wherein the light indicators are controlled by the control unit in order to light up green in the absence of operating faults, and red and/or flashing in the event of an operating fault.

15. The drill according to claim 9, comprising a display controlled by the control unit so as to display operating parameters of drill, said operating parameters being chosen from the group consisting of:
 a battery charge state,
 operation hours,
 remaining operation hours until maintenance is required,
 rotation direction of the motor,
 rotational speed of the spindle,
 name or series number of the drill,
 drill control firmware version,
 possible operating faults or errors,
 over-torque warning requested from the motor,
 battery undervoltage warning,
 battery overheating warning,
 incorrect motor power supply warning.

16. The drill according to claim 9, wherein the control unit comprises one or more of:
 a connection interface for the connection to an external electronic device for updating the drill control firmware and/or for transmitting operating parameters and identification data of the drill to the external electronic device,
 a GSM communication module for a data connection to the GSM mobile phone network,
 a localization device of the position thereof,
 a satellite localization device of the position thereof.

17. The drill according to claim 1, comprising a sheath made of flexible liquid-proof elastomeric material of a generally tubular shape, with a front opening and a rear opening opposite the front opening in the direction of the spindle axis, so as to be reversibly insertable and inserted over the electric motor and over at least part of the battery to protect them,
- wherein said sheath forms a ventilation channel with at least a first inlet opening obtained in an outer surface of the sheath and facing horizontally or downwards or externally covered from above, and with an inner ventilation portion, which is concave and open towards the interior of the sheath, so as to communicate cooling air from the inlet opening to a cooling system of the motor,
- wherein the sheath forms a battery opening positioned at the battery of the drill to allow the coupling and uncoupling and the removal of the battery from the drill through the battery opening, without needing to remove the sheath from the drill.

18. The drill according to claim 1, wherein the movable casing portion is constrained to guiding columns by inserting two tubular seats on corresponding free ends of the guiding columns provided with a quick locking and unlocking device without threads.

\* \* \* \* \*